(12) United States Patent
Rouleau (10) Patent No.: US 12,043,152 B2
(45) Date of Patent: Jul. 23, 2024

(54) DEVICE FOR INSTALLING OR REMOVING A SEAT COVER

(71) Applicant: Martin Rouleau, Montreal (CA)

(72) Inventor: Martin Rouleau, Montreal (CA)

(73) Assignee: Martin Rouleau, Montreal (CA)

( * ) Notice: Subject to any disclaimer, the term of this patent is extended or adjusted under 35 U.S.C. 154(b) by 99 days.

(21) Appl. No.: 17/304,923

(22) Filed: Jun. 28, 2021

(65) Prior Publication Data

US 2021/0402900 A1 Dec. 30, 2021

Related U.S. Application Data

(60) Provisional application No. 63/044,826, filed on Jun. 26, 2020.

(51) Int. Cl.
*B60N 2/60* (2006.01)
*B65H 75/42* (2006.01)
*B65H 75/48* (2006.01)

(52) U.S. Cl.
CPC ......... *B60N 2/6045* (2013.01); *B65H 75/425* (2013.01); *B65H 75/486* (2013.01)

(58) Field of Classification Search
CPC .......... B60N 2/6027; B60N 2/60; A47C 31/11

USPC ................................... 297/221, 229, 228.11
See application file for complete search history.

(56) References Cited

U.S. PATENT DOCUMENTS

| | | | | | |
|---|---|---|---|---|---|
| 4,600,238 | A | * | 7/1986 | Goodford | B60N 2/6027 297/229 |
| 4,790,592 | A | * | 12/1988 | Busso | B60N 2/6027 297/229 |
| 6,382,720 | B1 | * | 5/2002 | Franklin | B60N 2/6027 297/229 |
| 6,659,551 | B1 | * | 12/2003 | Arenas | B60N 2/6063 297/229 |
| 7,690,725 | B1 | * | 4/2010 | Rawlings | A47C 31/11 297/229 |
| 9,327,629 | B2 | * | 5/2016 | Huebner | B60N 2/6027 |
| 10,207,604 | B2 | | 2/2019 | Stesl | |

* cited by examiner

*Primary Examiner* — Sarah B McPartlin
(74) *Attorney, Agent, or Firm* — Brouillette Legal Inc.; Robert Brouillette (57) ABSTRACT

The present invention generally relates to the field of seat covers and specifically to novel means for storing, installing and removing seat covers from seats. In its simplest form, the device comprises a removable seat cover, a mounting element for installing the seat cover and a retraction system for removing the seat cover.

20 Claims, 12 Drawing Sheets

DEVICE FOR INSTALLING OR REMOVING A SEAT COVER

REFERENCE TO RELATED APPLICATIONS

The present patent application claims the benefits of priority of commonly assigned provisional American Patent Application No. 63/044,826, entitled "DEVICE FOR INSTALLING OR REMOVING A SEAT COVER" and filed at the United States Patent and Trademark Office on Jun. 26, 2020.

FIELD OF THE INVENTION

The present invention generally relates to the field of seat covers and methods to install yet remove seat covers and specifically to flexible seat covers and to methods to install yet remove flexible seat covers.

BACKGROUND OF THE INVENTION

Contour or bucket seats of the type used in cars and movie theaters are known in the art. Seat covers that serve to protect the original upholstery or to enhance the appearance of used or worn contour seats are also known in the art.

Installing a seat cover can be a tricky task that may involve physical force yet dexterity. The seat cover needs to fit snuggly over the seat for both comfort and appearance. The design and choice of materials can make the task of installing or removing a seat cover easier, but in many cases, strength is needed to install the seat cover properly.

It is further unpractical to fully install or uninstall a seat cover in constrained area, such as in a vehicle or when many seats are installed next to one another, such as in movie theaters. More so, storing the seat cover before or after installation may also be problematic. Accordingly, there is a need for a device allowing the storing, installation yet removal of a seat cover on a seat.

SUMMARY OF THE INVENTION

The shortcomings relating to the storing, installation or removal of a seat cover are generally overcame by the novel device of the present invention.

A device for storing, installing and removing a seat cover on a seat is provided; the device comprising a seat cover, a mounting element attached to the seat cover and attachable to the seat, and a retraction system adapted to retract and store the seat cover when not in use, the retraction system being attachable to a portion of the seat.

The mounting element may separate a bottom section and an upper section of the seat cover. The mounting element may further be insertable between a back supporting portion and sitting portion of the seat, when in use, the bottom section of the seat cover covering the sitting portion of the seat and the upper section of the seat cover covering the back supporting portion of the seat. The seat cover may further comprise a top section attachable to a top portion of the seat. In another aspect of the invention, each of the bottom and upper sections of the seat cover comprising fasteners mating with each another.

In another aspect of the invention, the retraction system may be attachable to an end of the sitting surface of the seat. The retraction system may further be within a housing, the housing containing the seat cover when fully retracted. The housing may be shaped as a substantially triangular prism with rounded edges, the housing comprising a slit for the passage of the seat cover.

In yet another aspect of the invention, the device may comprise a clamp system for attaching the device to the seat. The retraction system may further comprise a spring loaded shaft for enrolling the seat cover and a triggering device, the triggering device releasing the spring to retract the seat cover around the shaft. The retraction system may further comprise a clutch system for automatically stopping the retraction of the seat cover.

In another aspect of the invention, the mounting element may comprise a handle for manipulation by a user. The retraction system may further comprise a stopper for stopping retraction of the seat cover. The mounting element may also comprise a support surface for contacting against the stopper.

In another aspect of the invention, the retraction system may comprise thermoplastics adapted for high load mechanical operations. The thermoplastics may be Derlin® acetal homopolymer.

The seat cover may be composed of any material that is designed to include desired features, such as durability, texture and color. The seat cover center area may comprise a neoprene foam laminated with a fabric selected from the group consisting of, but not limited to, jersey fabrics, stretch fabrics, thermo jersey fabrics, plush and brush fabrics, Velcro® fabrics and abrasion resistant fabrics.

The contour of the seat cover may be composed of a fabric or material that includes a fiber that provides low to moderate stretch (or flexibility) to the seat cover, such Lycra® T400®.

In one embodiment, the retraction system is generally comprised of a roller blind mechanism that includes a roller mechanism, a torsion spring mechanism and a clutch system.

In one embodiment, the torsion spring mechanism of the retraction system comprises a main spring, a center rod, a main tube, a main tube coupling and a clutch mechanism. The clutch mechanism comprises a main tube ratchet coupling and a ratchet button brake, as well as standard fittings that are known to those of skill in the art.

The retraction system may further comprise mechanical components composed of Delrin® acetal homopolymer which is normally used for high load mechanical applications. Delrin® acetal material combines low friction and high wear with an operating range between −40° C. and 120° C.

In another aspect of the invention, the housing means may be composed of any suitable material, including resins and plastics, such as an ABS-PC Blend comprising Cycoloy™ Resin C1200HF.

A method for covering a seat is also provided, the method comprising the steps of pulling a seat cover away from a resilient retraction device, covering a sitting surface of the seat with the seat cover, mounting the cover between the sitting surface and a back supporting surface of the seat, covering the back supporting surface of the seat with the seat cover, attaching an upper portion of the seat cover to an upper portion of the seat. The method may further comprise deactivating a clutch to allow the pulling of the seat cover and the mounting of the cover between the sitting surface and the back supporting surface may further comprise lodging a mounting element between the sitting surface and the back supporting surface.

A method for storing a seat cover is further provided, the method comprising, the steps of detaching a top portion of the seat cover from a seat, folding the top portion over a lower portion of the seat cover, unmounting the seat cover from a junction of a sitting surface and a back supporting surface of the seat, resiliently retract the seat cover using a retraction system, covering a sitting surface of the seat with the seat cover, mounting the cover between the sitting surface and a back supporting surface of the seat, covering the back supporting surface of the seat with the seat cover, attaching an upper portion of the seat cover to an upper portion of the seat. The method may further comprise deactivating a clutch to allow the retraction of the seat cover, and wrapping the seat cover around the retraction system for storing.

Other aspects and advantages of the present invention will be apparent upon an understanding of the illustrative embodiments described below.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE INVENTION

A novel device for installing or removing a seat cover will be described hereinafter. Although the invention is described in terms of specific illustrative embodiment(s), it is to be understood that the embodiment(s) described herein are by way of example only and that the scope of the invention is not intended to be limited thereby.

Figure 1:
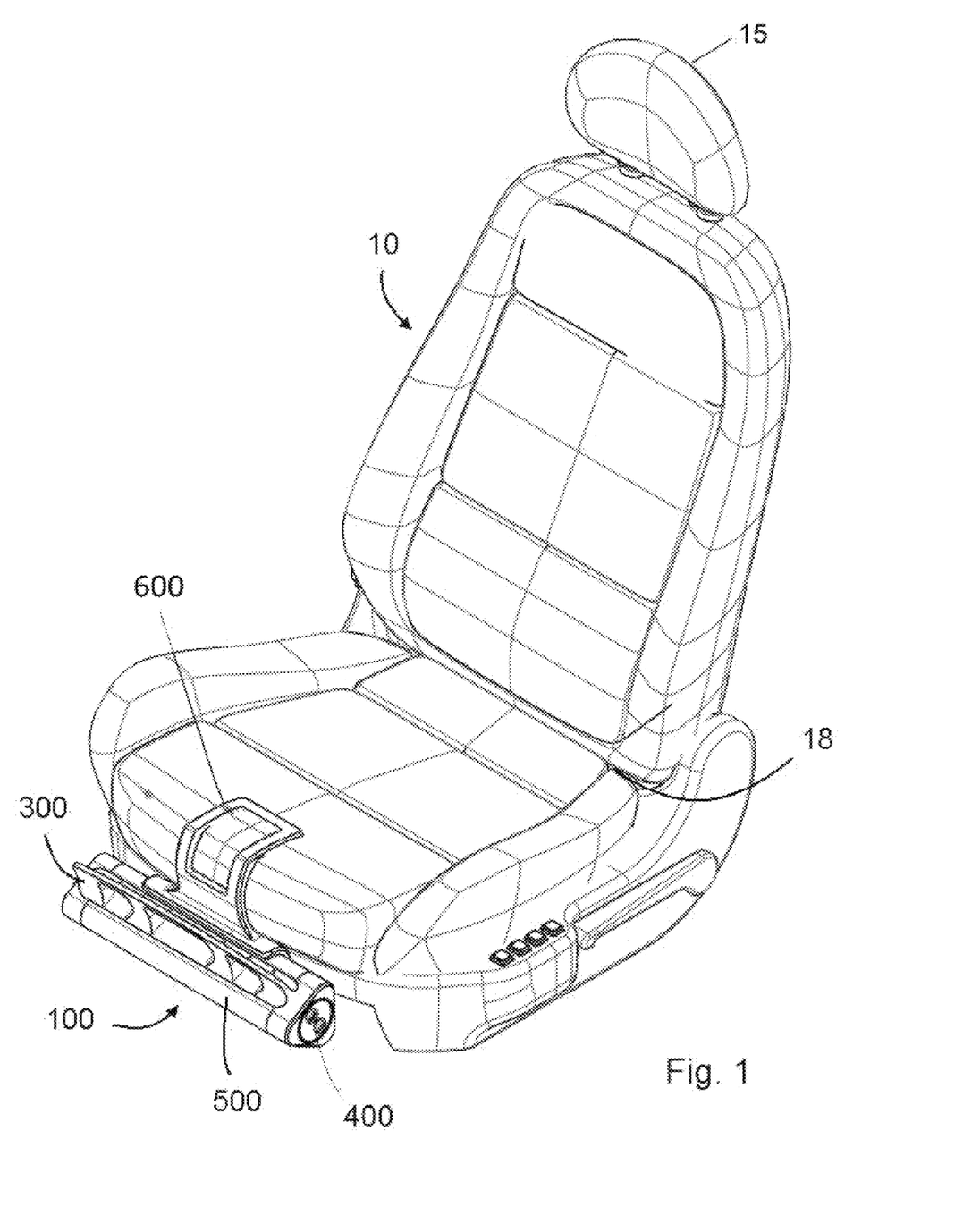
FIG. 1 is a perspective view of an embodiment of a device for retractably installing a seat cover attached to a seat prior to deployment in accordance with the principles of the present invention.

Referring to FIG. 1, a representative embodiment of a device 100 for installing or removing a seat cover 200 in accordance with the present invention is shown connected to a contour seat 10 of the type found in automotive vehicles and with the seat cover 200 being in a retracted position.

The device 100 generally comprises a mounting element 300 and a retraction system 400. The mounting element 300 and the retraction system 400 are both connected to and operatively linked with a seat cover 200 (not visible from FIG. 1). It may be understood that the retraction system 300 may further be called a retractation system, a withdrawal system or any other variation of the word retraction allowing the retraction of the seat cover 200 and mounting element 300.

Prior to installation, the seat cover 200, the mounting element 300, and the retraction system 400 are conveniently contained within an optional housing means 500. In the embodiment illustrated in FIG. 1, the housing means 500 has the shape of a triangular tube with rounded edges. Other shapes and means for housing the seat cover 200 are possible, as would be understood by one of skill in the art.

As further shown in FIG. 1, the housing means 500 may be secured below the proximal end of the sitting portion of the seat 10, through the use of attachment means 600. In the embodiment shown in FIG. 1, the attachment means 600 is a clamping element. Other attachment means are possible for securing the device 100 to the proximal end of the sitting portion of the seat 10, as would be understand by one of skill in the art. Understandably, the attachment means 600 may be mounted to other portions of the seat 10.

Figure 2:
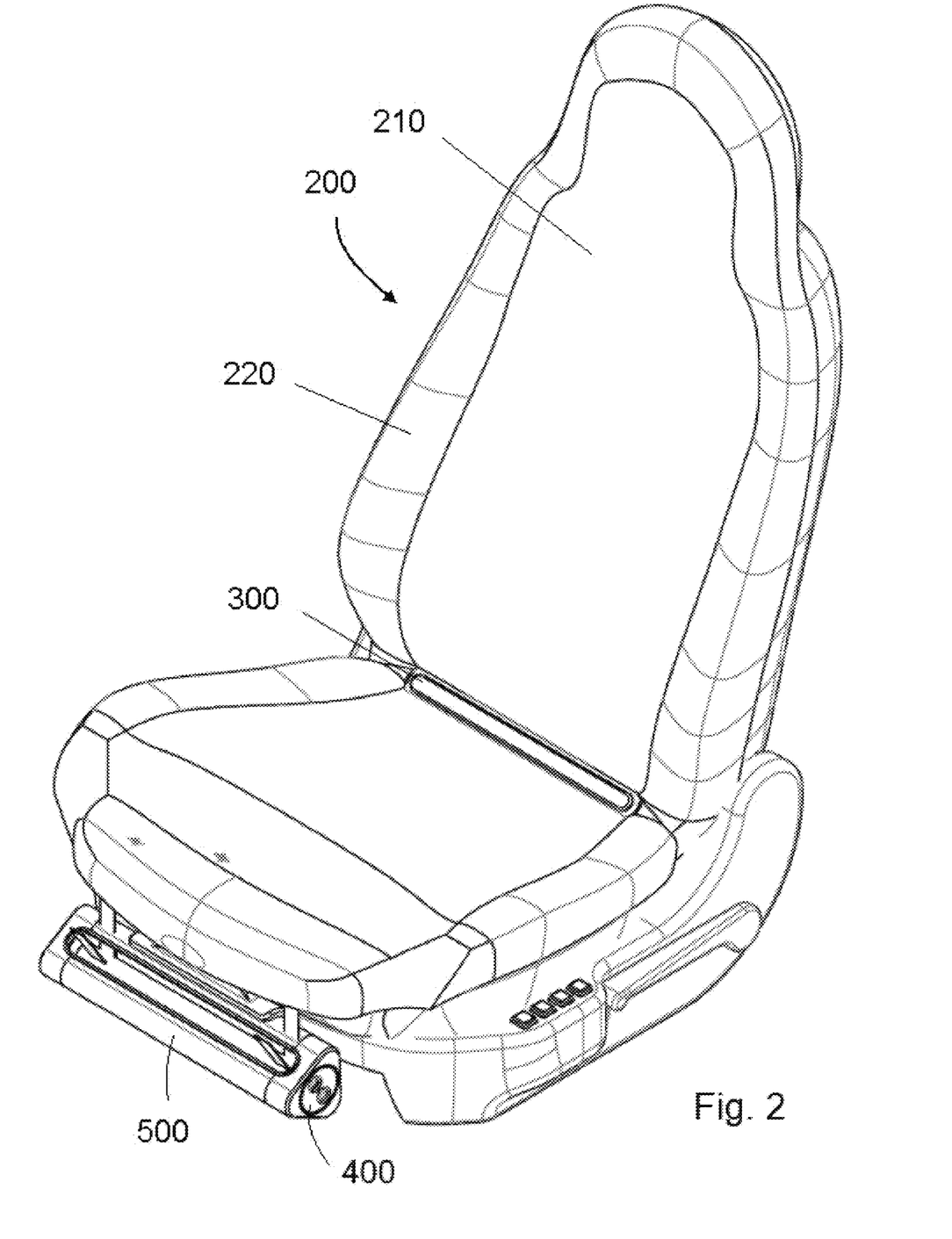
FIG. 2 is an perspective view of the device of FIG. 1 showed with the cover in use with a seat.

FIG. 2 shows a representative embodiment of the device 100 with the seat cover 200 installed over a seat. As shown in FIG. 2, the mounting element 300 is securely positioned at the junction 18 between the sitting portion and the back portion of the seat 10. In a preferred embodiment, the mounting element 300 may be inserted between the sitting portion and the back portion of the seat 10. The mounting element 300 generally divides the seat cover 200 into two sections, namely, a bottom section 204 covering the sitting portion of the seat and a top section 208 covering the back portion (and possibly a head rest 15, shown in FIGS. 1 and 3) of the seat 10. In this embodiment, the design of the seat cover 200 comprises a center area 210 and a surrounding trim 220.

Figure 3:
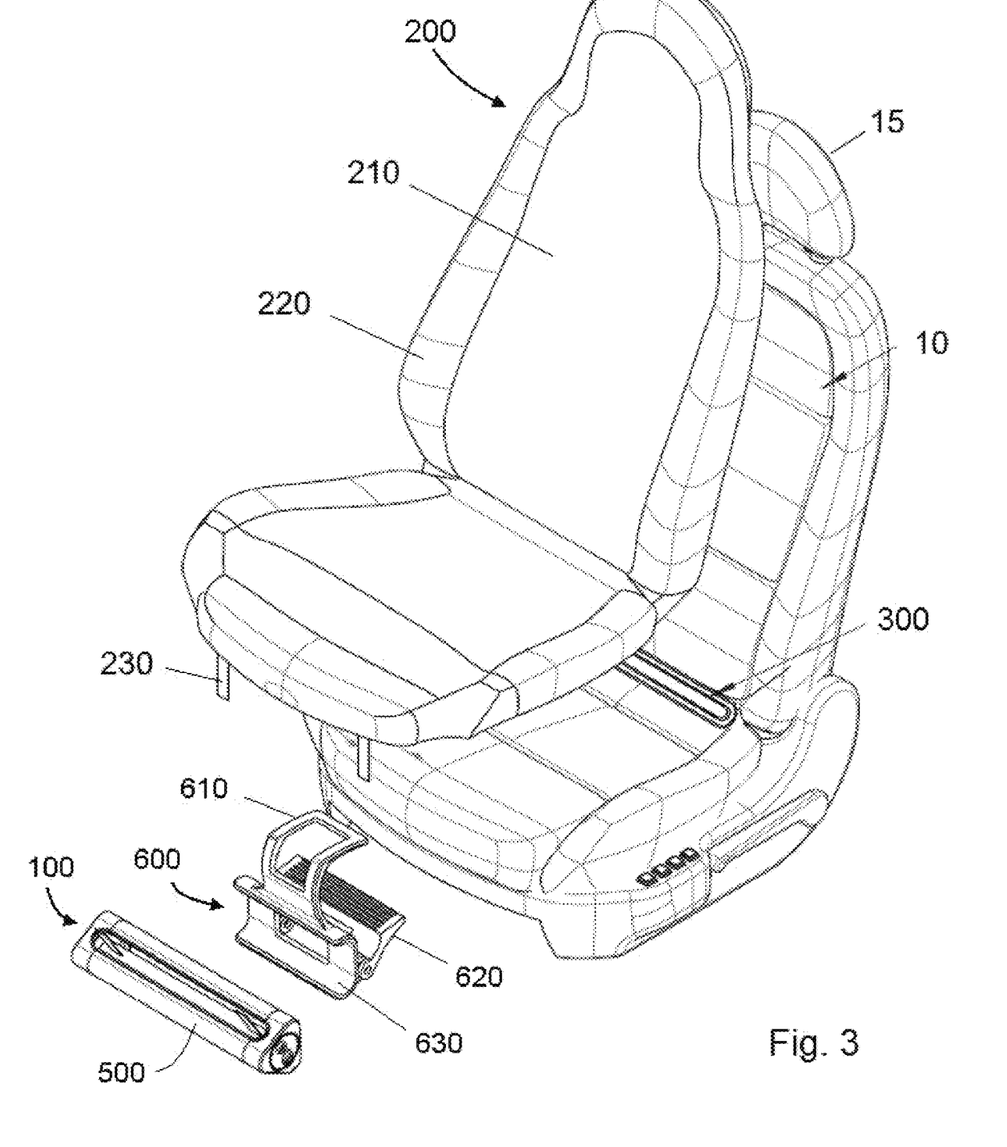
FIG. 3 is a partially exploded perspective view showing the components of the device illustrated in FIG. 2.

FIG. 3 is an exploded view of the embodiment shown in FIG. 2. As shown in FIG. 3, the seat cover 200 further comprises attachment means 230 to join the housing means 500 of the device 100 to the bottom of the seat cover 200 when it is installed over a seat 10.

FIG. 3 further shows the details of an embodiment of the attachment means 600. In this embodiment, the attachment means 600 comprises a double-sided clamping element. As shown in FIG. 3, the distal side of the double-sided clamping element of the attachment means 600 comprises a bracket 610 and a step 620 which together are attached to the proximal end of the sitting portion of the seat 10. When the seat cover 200 is installed over the seat, the bracket 610 and the step 620 are hidden from view under the seat cover 200.

The attachment means 600 further comprises a holding element 630 configured to receive and secure the housing means 500 of the device 100. The location of the combined housing means 500 and attachment means 600 is designed for comfort and convenience. In use, it is sufficiently removed from the body of a person sitting in the covered seat 10, and at the same time it remains close to the seat so that it may receive the seat cover 200 if the decision is made to retract it from the seat 10.

It will be understood by those of skill in the art that the housing means 500 of the device 100 of the present invention may be kept in close proximity to the seat 10 by a variety of means. For example, Velcro® fasteners may be used to attach the housing means 500 of the device 100 to the seat 10. The housing 500 may further be fastened to anchorage point of the vehicle or to the seat 10.

Figure 4:
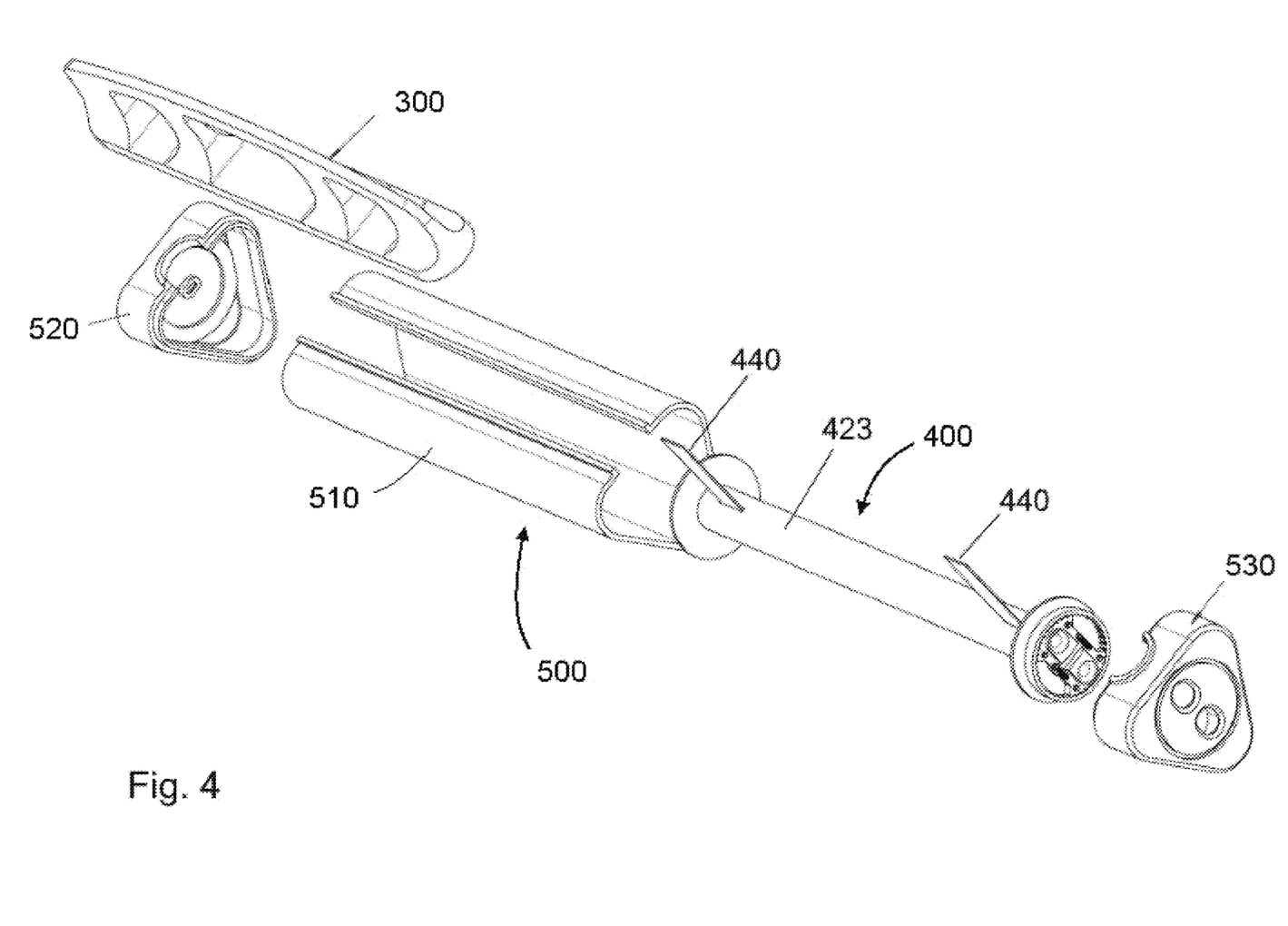
FIG. 4 is an exploded perspective view of an embodiment of a retraction system for retractably installing a seat cover in accordance with the principles of the present invention.
Figure 5:
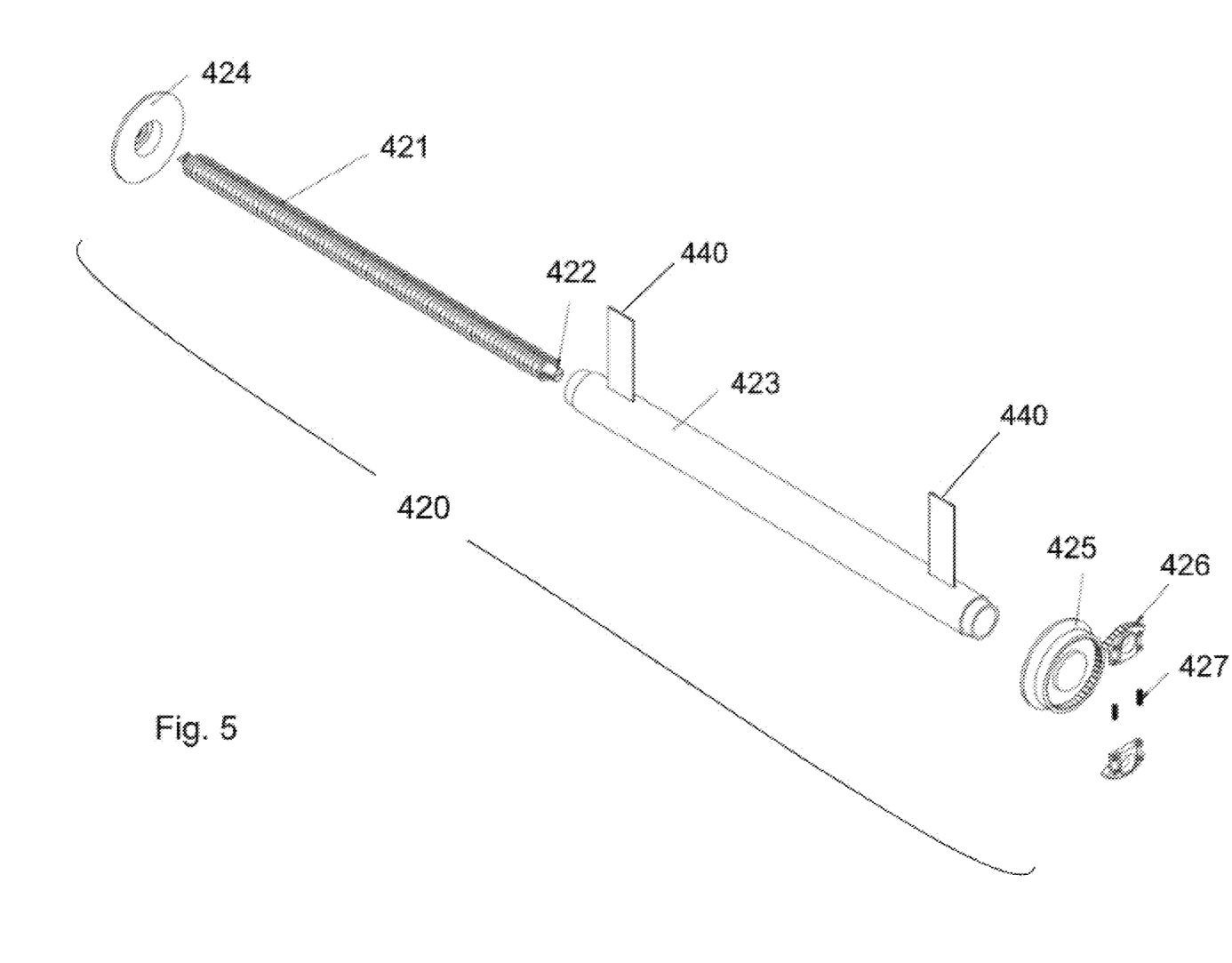
FIG. 5 is a perspective view of the various components of an embodiment of a torsion spring mechanism of the retraction system shown in FIG. 4.

FIG. 4 is an exploded view of the device 10 showing the mounting element 300 and elements of the retraction system 400 and housing means 500. In the embodiment shown in FIG. 4, the retraction system 400 comprises a roller mechanism 420, whose elements are illustrated in FIG. 5. As further illustrated in FIG. 4, in some embodiments, the housing means 500 for the retraction system 400 may comprise an outer shell 510 (here, in the general shape of a triangular tube with rounded edges) and two end caps 520 and 530.

FIG. 5 is an exploded view showing the elements of the roller mechanism 420 of the retraction system 400 shown in FIG. 4. In the embodiment shown, the roller mechanism 420 comprises a torsion spring 421 adapted to resiliently rewind the cover over a shaft 423. The roller mechanism 400 may comprise a main spring 421, a center rod 422, a main tube 423, a main tube coupling 424, a main tube ratchet coupling 425, a clutch mechanism 426, fittings 427 (here, type 9657K263); and attachment means 440 for joining the retraction system 400 to the attachment means 230 of the seat cover 200. The clutch mechanism may be a ratchet button brake which allows direction in one direction (not shown). Accordingly, a user may activate the ratchet button brake by pressing one button which may block the rotation of the roller mechanism 400. When activated, the cover sheet 200 may not move and may thus not be retracted when installed on the seat 10. Do deactivate the clutch 426, a user may press another button, not shown, which may disengage the clutch system 426 with the main tube ratchet coupling 425, thus allowing the tube 423 to freely rotate and retract or release the cover sheet 200. The clutch device 426 may be embodied by any known clutch system in the art.

Figures 6A, 6C:
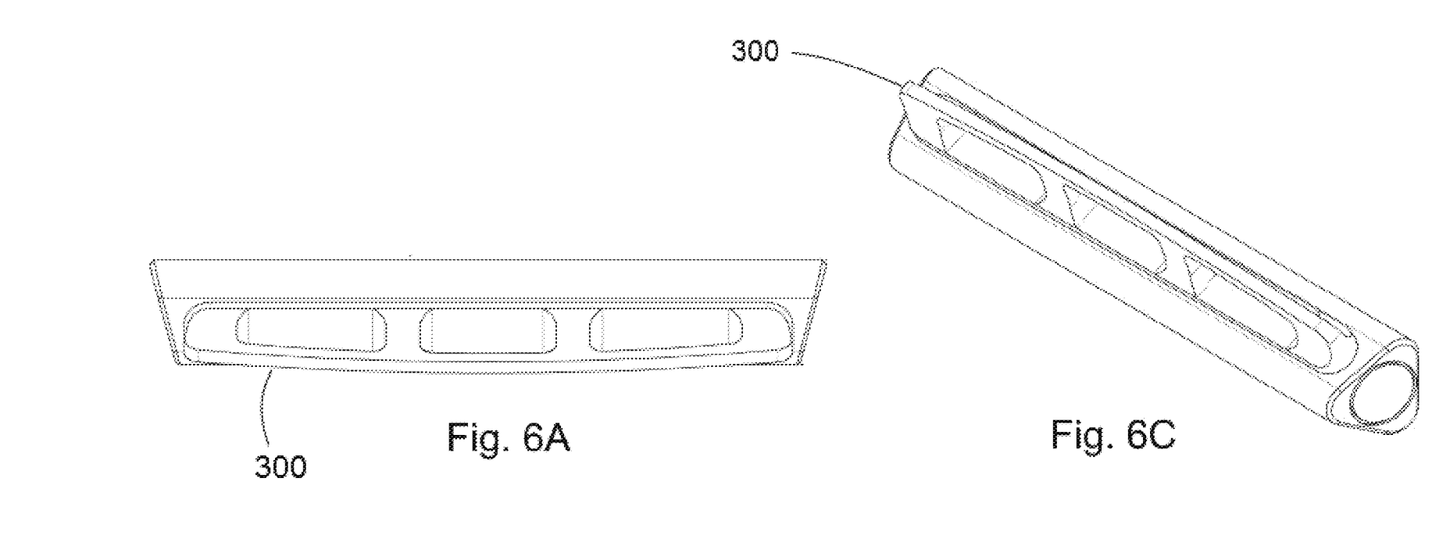
FIG. 6A is a back elevation view of an embodiment of the retraction system shown in FIG. 4 shown with a mounting element (pull handle)
FIG. 6C is a side perspective view of the retraction system of FIG. 6A.
Figure 6B:
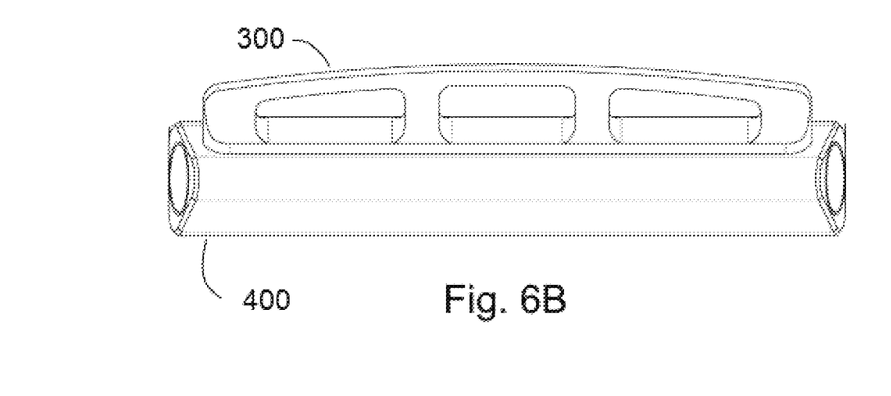
FIG. 6B is a front perspective view of the retraction system of FIG. 6A.
Figure 6D:
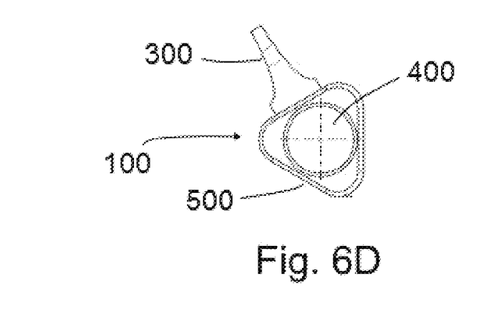
FIG. 6D is a side elevation view of the retraction system of FIG. 6A.

FIGS. 6A-6C show the mounting element 300 (pull handle) from different angles. FIG. 6D shows the mounting element 300 in the housing means 500 of the device 100.

Figures 7A, 7B, 7C:
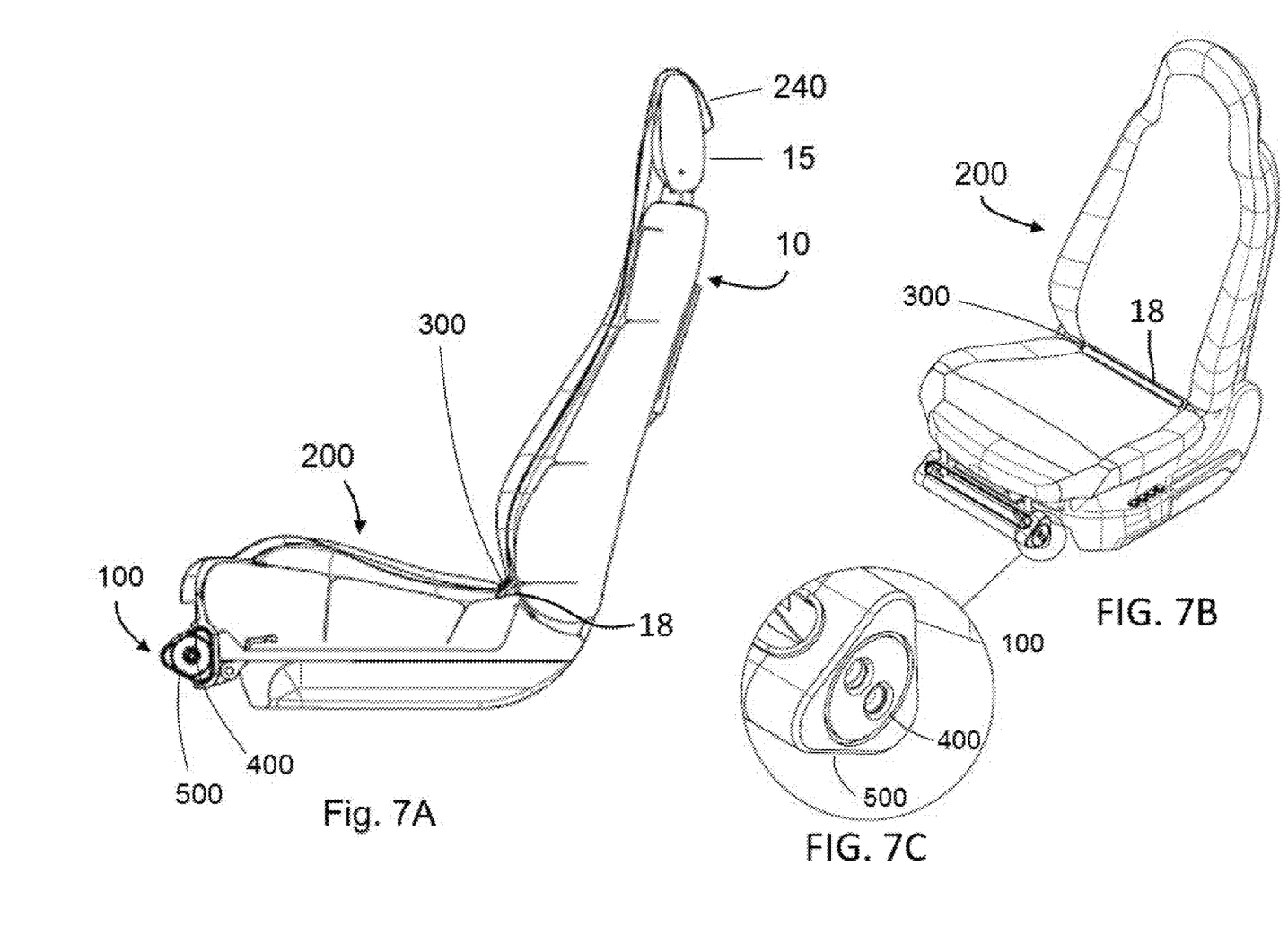
FIG. 7A is a side elevation view of an embodiment of a device for retractably installing a seat cover in accordance with the principles of the invention, the device being shown as deployed, the retraction system of the device being shown in a locked position.
FIG. 7B is a perspective view of the device of FIG. 7A.
FIG. 7C is a detailed perspective view of the retraction system and housing of FIG. 7B.

FIGS. 7A-7C show the device 100 attached to a seat 10 with the mounting element 300 placed in the middle section 18 of the seat 10 to keep the seat cover 200 in place at the middle section 18. The seat cover may further comprise a flap 240 at its top surface to be folded over the head rest 15 of the seat 10 to keep it in place.

Figures 8A, 8B:
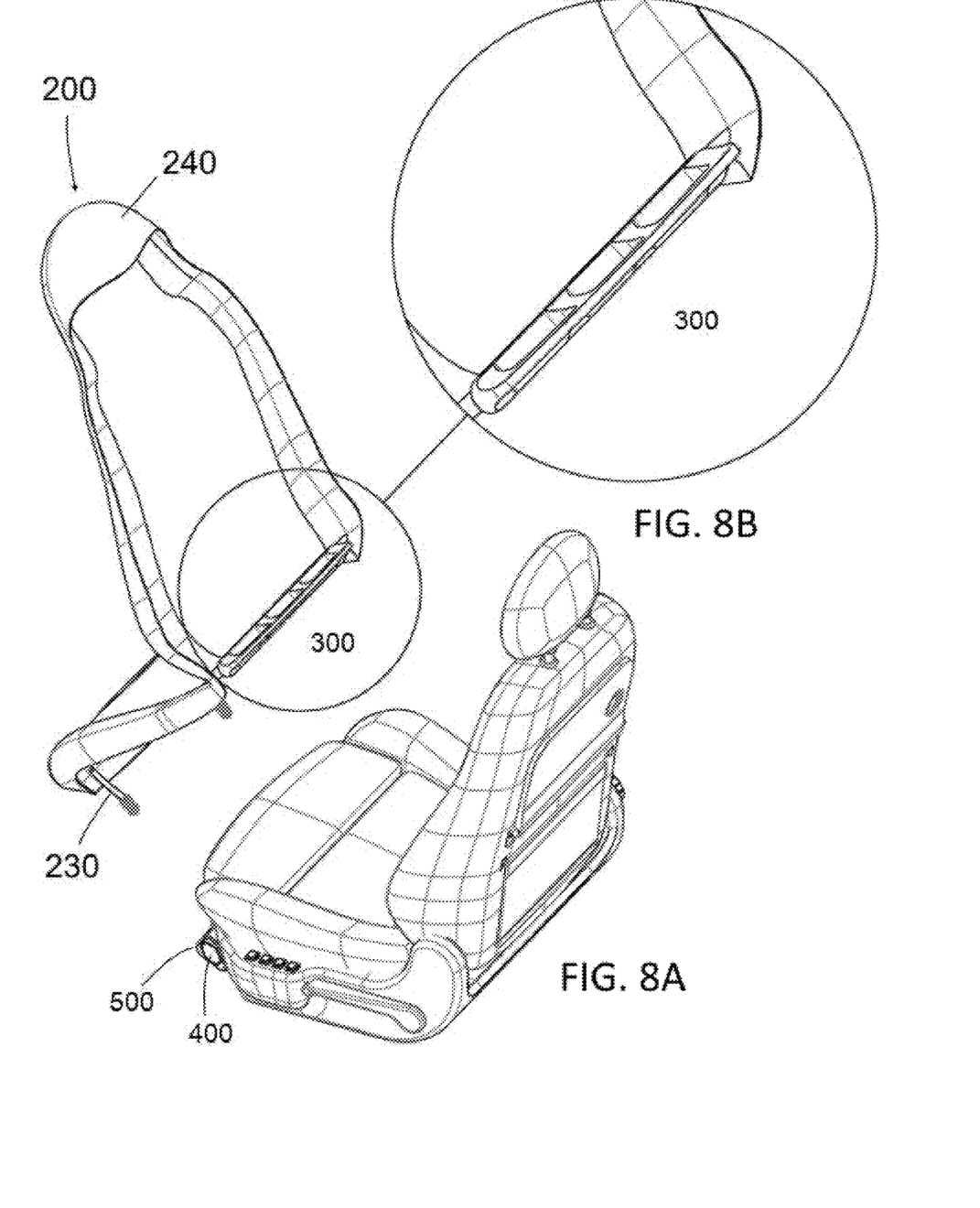
FIG. 8A is a back perspective view of an embodiment of a device for retractably installing a seat cover in accordance with the principles of the invention shown with the cover being not installed of the seat.
FIG. 8B is a detailed perspective view of the mounting element of the device of FIG. 8A.

FIGS. 8A and 8B show the back side of the seat cover 200 with the mounting element 300 attached to the seat cover 200. In such an embodiment, the optional flap 240 is located at the top surface of the seat cover 200, or the top section 208, and two attachment means 230 for joining the housing means 500 of the device 100 are located at the bottom of the seat cover 200. Understandably, the flap 240 may be configured to be installed over the top of a seat 10 with or without head rest 15. In some embodiments, not shown, the cover 200 may comprise a head section 212 over the top section 208 to provide better fitting to a head rest. Instead of a flap 240, the cover 200 may instead or further comprise attachments means 235, not shown, to secure the cover 200 to the top of the seat 10. The attachments means 235 may be any attachment means know in the art, such as hook and loops and belt clips.

The seat cover 200 may further comprise securing means, not shown, for securing an area of the seat cover 200 to another area of the same. The securing means may be embodied as clips, hooks, auto gripping and loops, magnets and any other type of securing means for securing two surfaces against one another. The securing means are used to secure the different surfaces of the cover 200, namely the bottom 204, top 208 and head 212 sections of the cover 200, against one another when folding. Securing the surfaces together when folding may prevent bundling up and blockage of the cover 200 around the retraction system 400 and/or inside the housing 500.

Figures 9A, 9B:
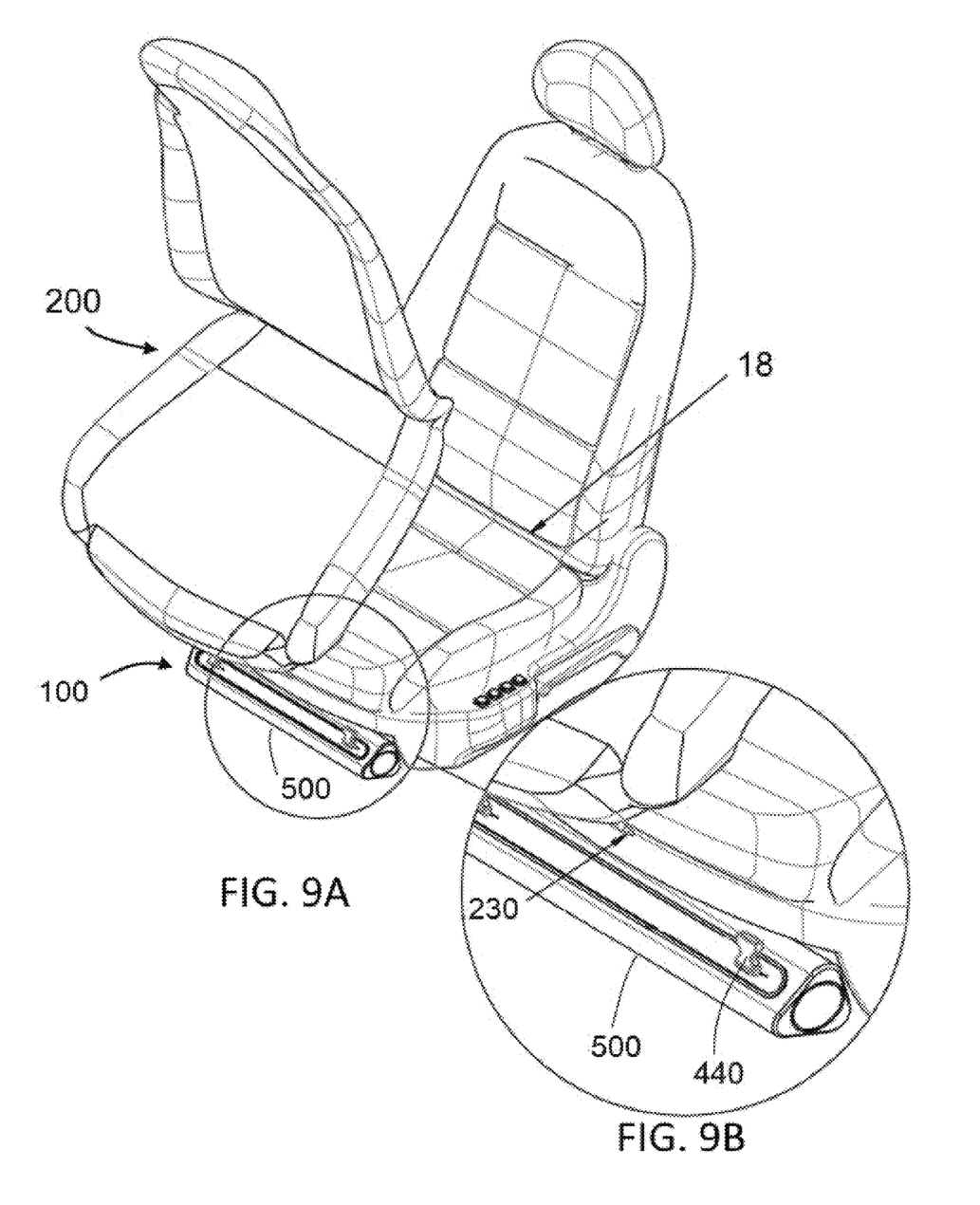
FIG. 9A is a perspective view of another embodiment of a device for retractably installing a seat cover in accordance with the principles of the invention shown with the cover being not installed over the seat cover.
FIG. 9B is a perspective detailed view of the retraction system of the device of FIG. 9A.

FIGS. 9A and 9B show the front side of the seat cover 200, the attachment means 230 of the seat cover 200 and the attachment means 440 of the retraction system 400. The middle section 18 of the seat 10 where the mounting element 300 is placed is also indicated.

Figures 10A, 10B, 10C:
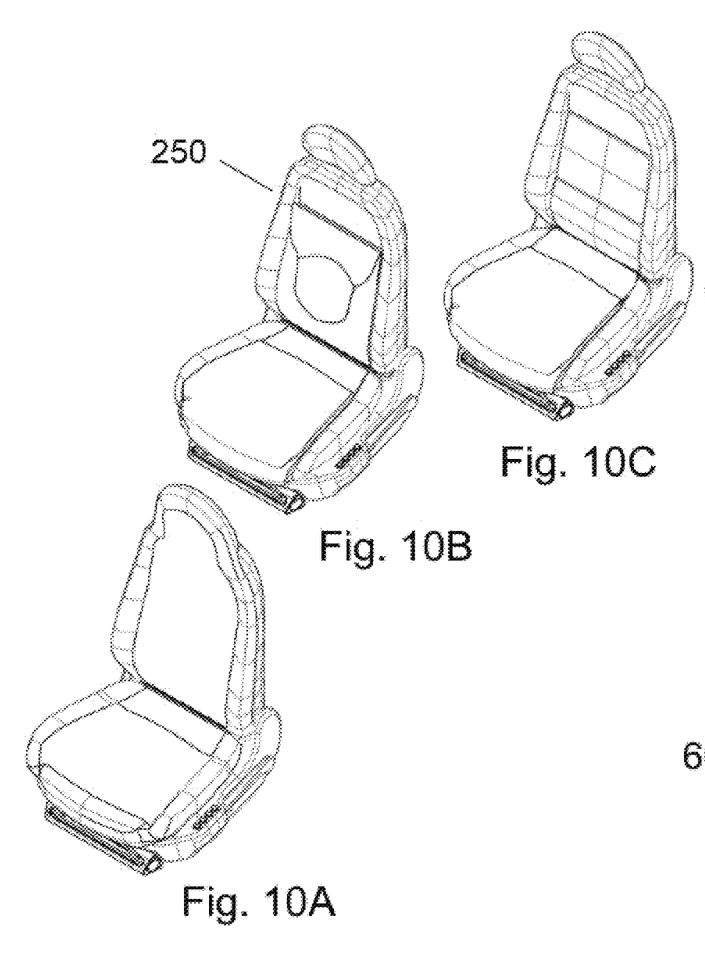
FIG. 10A to FIG. 10F are perspective views of an embodiment of a device for retractably installing a seat cover in accordance with the principles of the invention showing different step of the removal of the seat cover from the seat.
Figures 10D, 10E, 10F:
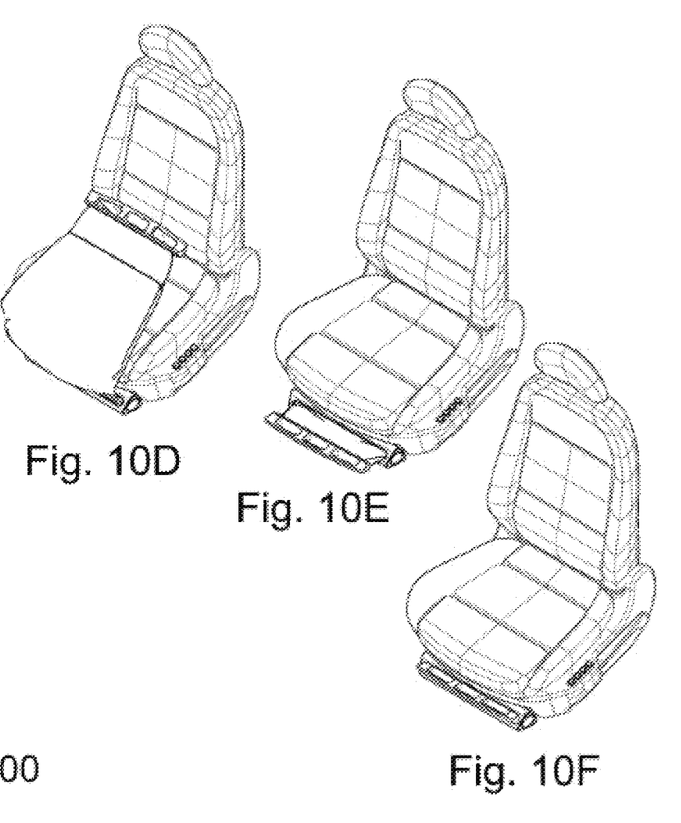

FIGS. 10A-10F illustrate a method to remove (retracting) a seat cover 200 from a seat 10. The method may comprise unfolding the flap 240 at the top of the seat cover 200 and laying the said flap 240 flat on top of the seat cover at the indicated folding line 250, as illustrated in FIG. 10B. The method may further comprise folding the seat cover 200 about the mounting element 300. As such, the top portion 208 of the seat cover 200 is typically folded over the lower portion 204 of the seat cover 200, as illustrated in FIG. 10C. The method may further comprise removing the mounting element 300 from the middle section 18 of the seat 10, as illustrated at FIG. 10D. The method may further comprise retracting the folded seat cover 200 into the housing means 500 using the retraction system 400, as shown in FIG. 10E. The method further comprises the mounting element 300 stopping the retraction of the cover 200 in the retraction system 400 by contacting the housing means 500.

In an embodiment of the seat cover 200 comprising securing means on the cover 200, the method may further comprise securing the folded sections of the cover against one another before being retracted with the retraction system 400.

Understandably, the installation of the seat cover 200 may be generally performed by following the same steps as the removal of said seat cover in reverse order. The installation and removal of the seat cover 200 may further comprise attaching the retraction device 400 to the seat 10 with an attachment means 600.

Figure 11:
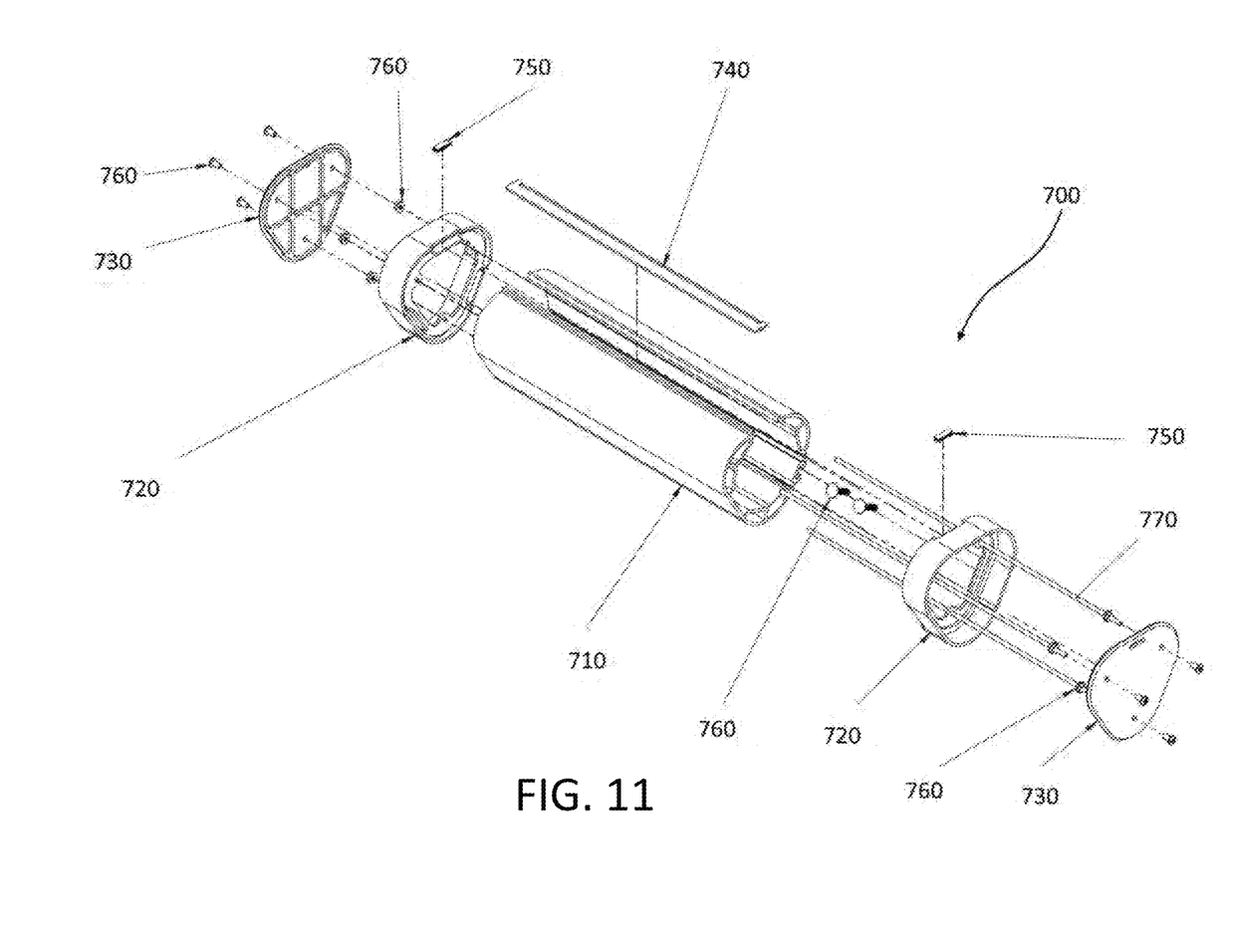
FIG. 11 is an exploded perspective view of a housing means in accordance with the principles of the invention.

Referring now to FIG. 11, another embodiment of the housing means 700 is shown. The housing means 700 is configured to house a retraction system 400 and may be attached to a seat or chair 10 using the attachment means 600. In such embodiment, the housing 710 has a substantially triangular shape having rounded edges or of a triangular prism shape. It may be appreciated that compared to the housing 510 which is made of a single sheet of material for the circumference, the housing 710 comprises multiple layers of material which helps fixating other components of the housing means 700 by adding additional matter for fixation and which provide further mechanical resistance to said housing 710. On each side, the housing 710 is closed off by a cap 720, a panel 730, fixation bars 770 and a variety of fastening means 760. Understandably, the housing 710 may be replaced by any other type of housing or may be omitted in some embodiments.

The housing means 700 further comprises a stopper 740 which may be attached to the housing 710. In some embodiments, the stopper is attached using an attachment means 750, such as but not limited to a hook-and-loop fastener. The stopper 740 is generally adapted to stop, limit or refrain the mounting element 300 from entering the housing 710 or the retraction system 400 when fully retracted. Accordingly, the stopper 740 will limit the retraction of the seat cover 200. The stopper 740 further generally aims at leaving enough place for the cover 200 to go in and out of the housing 710 while blocking the entry of the mounting element 300. The housing means 700 may further comprise a similar retraction system 400 than the other embodiment of housing means 500. Accordingly, the retracted seat cover 200 may be wrapped around the retracting means 400, optionally inside the housing 710. In some embodiments, the retracting means 400 comprises a roller mechanism 420 adapted to receive and roll the seat cover 200. Understandably, the stopper 740 may have any other shape allowing the stopping of the mounting element 300 while simultaneously allowing the retraction of the cover 200. The stopper 740 may be located on other elements of the device 100 such as the retraction system 400.

Figure 12:
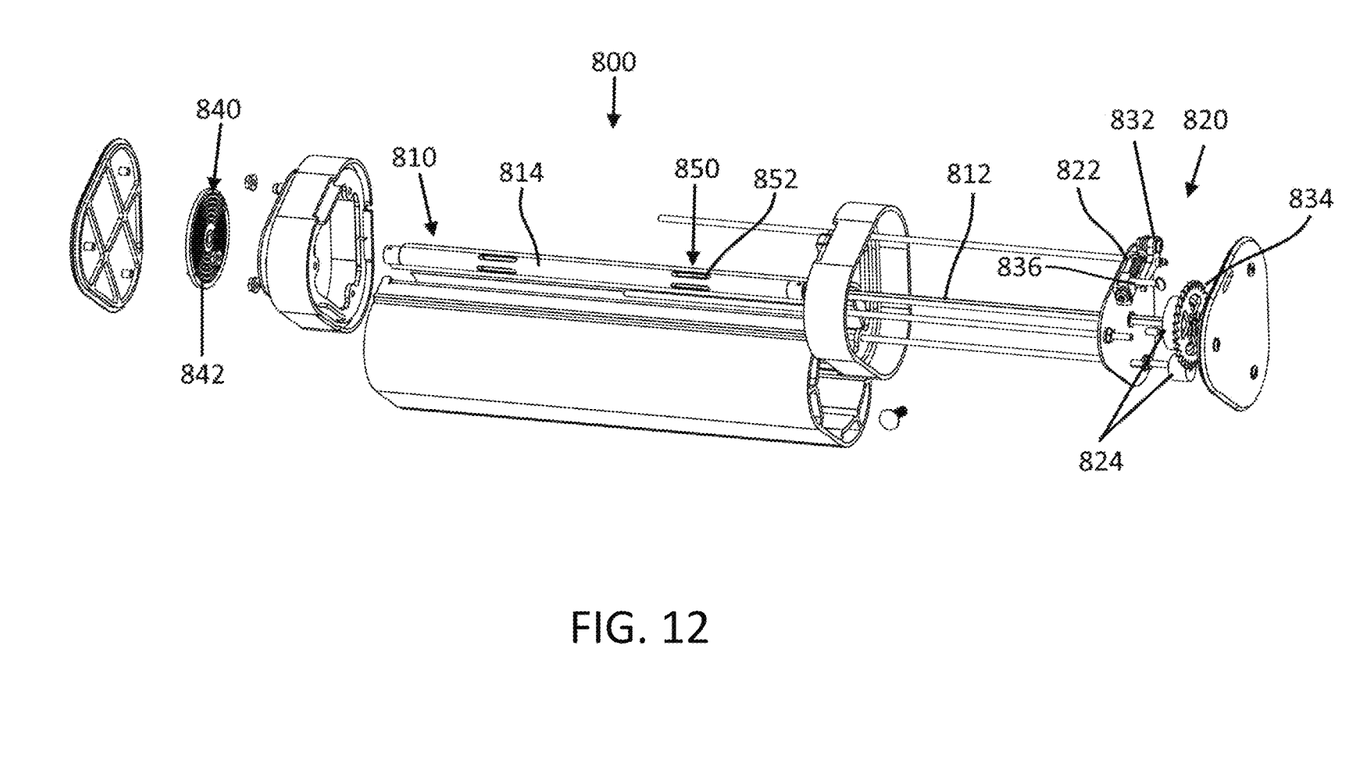
FIG. 12 is an exploded perspective view of an embodiment of a retraction system of the device for retractably installing a seat cover in accordance with the principles of the present invention.

Now referring to FIG. 12, the housing means 500 or 700 may comprise another embodiment of a retraction system 800. Again, the retraction system 800 generally aims at retracting a cover 200 attached to the said retraction system 800. The retraction system 800 may first comprise a roller mechanism 810 comprising a center rod 812, a shaft 814. The shaft 814 may comprise attachments means 850 for attaching the cover 200. In the illustrated embodiment, the attachment means 850 comprises slits 852 allowing the attachment of straps connected to the seat cover 200, not shown, such as but not limited to hooks and loops straps.

The retraction system 800 may further comprise a driving assembly 820, a clutch mechanism 830 and a rotation limiter 840. In such an embodiment, the driving assembly 820 retracts the cover 200 when said cover 200 has been partly or fully removed/unrolled from the retraction system 800. The driving assembly 820 may comprise a gear 834 operatively connected to a ratcheting system 832. The ratcheting system 832 may be resilient, such as connected to a spring or resilient member 822. The ratcheting system 832 may thus drive the compression spring 840 through the shaft 814. The shaft 814 may be operatively connected to a rod 812 which is connected to the gear 834. Accordingly, moving an activation device 836 to release the ratcheting system 832 which in turns place the gear 834 in idling. The pressure in the compression spring 840 is then released which creates a rotation movement in the shaft 814, thus rolling the attached seat cover 200. Understandably, the driving assembly 820 may comprise any other type of activating means, not shown, to rotate said assembly 820. For example, the driving assembly 820 may comprise a motor, such as a servo-motor, for rotating the shaft 814 in any desired direction.

Other configurations of driving assemblies may be used, such as configurations having different ratios of torque transmission, having more or less belt driver rollers 824 and so on. In yet another embodiment, the ratcheting system 822 may simply accumulate energy when the cover 200 is pull from the device 800. Thus, when the seat cover 200 is release from the seat 10, the accumulated energy is released to create a rotation movement of the shaft 814.

The clutch mechanism 830 comprises a ratchet 832 configured to stop the pivot in one direction of a cog 834 pivotally linked to one of the belt drive rollers 822. Accordingly, the clutch mechanism 830 may stop the retraction of the cover 200 when activated, either by a user of passively by the positioning of the components (832, 834) clutch system 830 in relation to the retraction of the cover 200. Further comprised is the rotation limiter 840. The rotation limiter 840 may guide the cover 200 for efficient retraction around the roller mechanism 820 with guiding slits 842 so that said cover 200 does not improperly fold inside the housing 700 and creates blockings.

The device described hereinabove will find particular though not exclusive use with contour seats for cars and fixed back seats used in movie theaters. Understandably, the device as described hereinabove may further be used with any other seats or surfaces requiring to be covered and wherein the seat cover needs to be easily and practically stored. For example, hospital beds having a plurality of surfaces for supporting a patient may be covered by the seat cover of the device.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A device for storing, installing and removing a seat cover on a seat of a vehicle, the device comprising:
    a seat cover comprising a top section to cover a sitting portion of the seat and a bottom section to cover a back supporting portion of the seat;
    an intermediate mounting element attached between the top section and the bottom section of the seat cover, the mounting element comprising:
        an engagement portion insertable in between the back supporting portion and the sitting portion of the seat;
        an abutting portion opposite to the engagement portion; and
    a retraction system adapted to retract and store the seat cover with the abutting portion of the intermediate mounting element abutting against the retraction system when the seat cover is retracted, the retraction system being attachable to a front section of the sitting portion of the seat.

2. The device of claim 1, the seat cover being foldable about the intermediate mounting element and being inserted folded in the retraction system.

3. The device of claim 1, the top section being attachable to a top portion of the seat.

4. The device of claim 1, each of the bottom and top sections of the seat cover comprising fasteners mating with each another when the bottom and top sections are folded.

5. The device of claim 1, the retraction system being attachable yet detachable to the front section of the sitting portion of the seat.

6. The device of claim 1 further comprising a housing containing the retraction system and the seat cover when fully retracted.

7. The device of claim 6, the housing being shaped as a substantially triangular prism with rounded edges, the housing comprising a slit for the passage of the seat cover.

8. The device of claim 1, the device further comprising a detachable clamp system for attaching the device to the seat.

9. The device of claim 1, the retraction system comprising a spring loaded shaft for enrolling the seat cover and a triggering device, the triggering device releasing the spring to retract the seat cover around the shaft.

10. The device of claim 9, the retraction system further comprising a clutch system for automatically stopping retraction of the seat cover.

11. The device of claim 1, the engagement portion of the mounting element comprising a handle for manipulation by a user.

12. The device of claim 11, the abutting portion of the mounting element further comprising a stopper for limiting retraction of the seat cover in the retraction system.

13. The device of claim 12, the stopper limiting the retraction of the seat cover by contacting against the retraction system.

14. A method for covering a seat of a vehicle comprising:
pulling a seat cover folded about a mounting element attached between a top section and a bottom section of the seat cover away from a retraction device;
covering a sitting surface of the seat with the seat cover;
unfolding the seat cover;
inserting the mounting element between the sitting surface and a back supporting surface of the seat;
covering the back supporting surface of the seat with the seat cover;
attaching a top portion of the seat cover to an upper portion of the back supporting surface of the seat.

15. The method of claim 14, the method further comprising:
deactivating a clutch to allow the pulling of the seat cover.

16. The method of claim 14, the pulling a seat cover away from a retraction device further comprising pulling the mounting element away from the retraction device.

17. The method of claim 14, the method further comprising unfolding the seat cover prior to cover the sitting surface or the back supporting surface of the seat.

18. A method for removing and storing a seat cover attached to a seat of a vehicle, the method comprising:
detaching a top portion of the seat cover from the seat;
folding the top portion over a lower portion of the seat cover about a mounting element attached between the top portion and the lower portion of the seat cover;
unmounting the mounting element of the seat cover from a junction of a sitting surface and a back supporting surface of the seat;
retracting the folded seat cover using a retraction system until the mounting element of the seat cover abuts against the retraction system.

19. The method of claim 18, the method further comprising deactivating a clutch to allow the retraction of the seat cover.

20. The method of claim 18, the method further comprising wrapping the seat cover around the retraction system until the mounting element abuts against the retraction system for storing.

* * * * *